J. GYULAY.
PLANTER.
APPLICATION FILED APR. 12, 1913.

1,072,942.

Patented Sept. 9, 1913.

2 SHEETS—SHEET 1.

WITNESSES
Samuel Payne
Karl H. Butler

INVENTOR
Joe Gyulay.
Henry C. Evert
ATTORNEY.

J. GYULAY.
PLANTER.
APPLICATION FILED APR. 12, 1913.

1,072,942.

Patented Sept. 9, 1913.
2 SHEETS—SHEET 2.

WITNESSES
Samuel Payne
Karl H. Butler

INVENTOR
Joe Gyulay.
Henry C. Evert
ATTORNEY.

UNITED STATES PATENT OFFICE.

JOE GYULAY, OF KANSAS CITY, MISSOURI.

PLANTER.

1,072,942.   Specification of Letters Patent.   Patented Sept. 9, 1913.

Application filed April 12, 1913. Serial No. 760,844.

*To all whom it may concern:*

Be it known that I, JOE GYULAY, a subject of the King of Hungary, residing at Kansas City, in the county of Jackson and State of Missouri, have invented certain new and useful Improvements in Planters, of which the following is a specification, reference being had therein to the accompanying drawing.

This invention relates to a planter, and the primary object of my invention is to provide an agricultural implement that can be advantageously used for planting seed potatoes in a furrow and covering the same.

Another object of this invention is to provide a planter constructed somewhat upon the principle of a plow, wherein novel means is automatically operated, as hereinafter set forth, for feeding seed potatoes from a hopper and depositing the same in advance of a plowshare.

A further object of this invention is to provide an agricultural implement of the above type consisting of comparatively few parts that are inexpensive to manufacture, easy to assemble, durable and highly efficient for the purposes for which it is intended.

With the above and other objects in view the invention resides in the novel construction, combination and arrangement of parts to be hereinafter specifically described and then claimed.

Reference will now be had to the drawings, wherein:—

Figure 1:
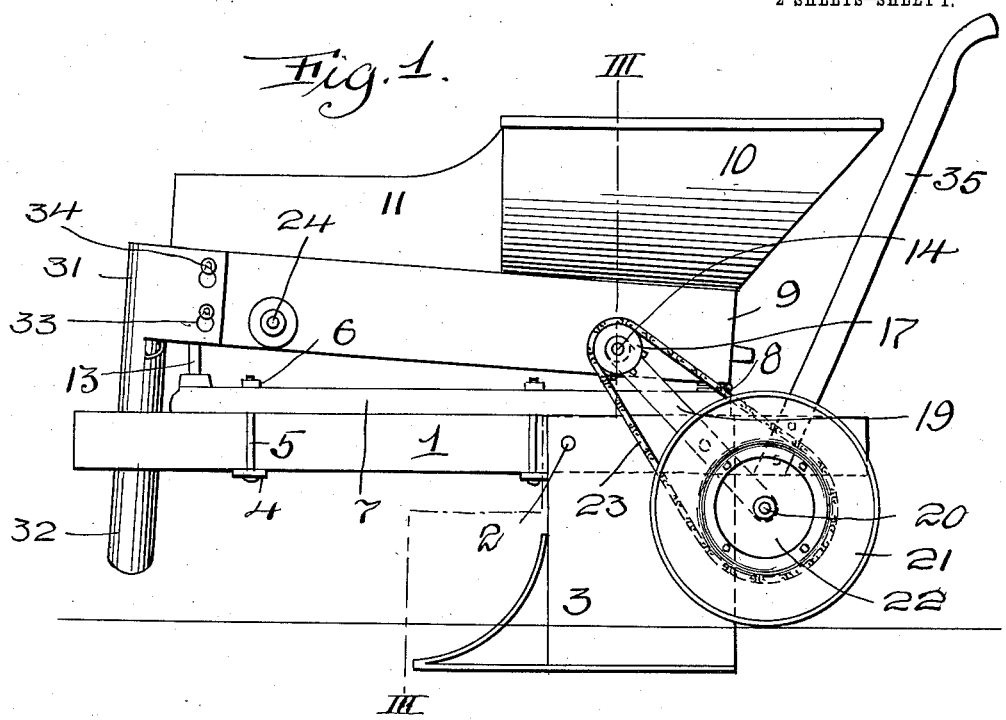
Figure 2:
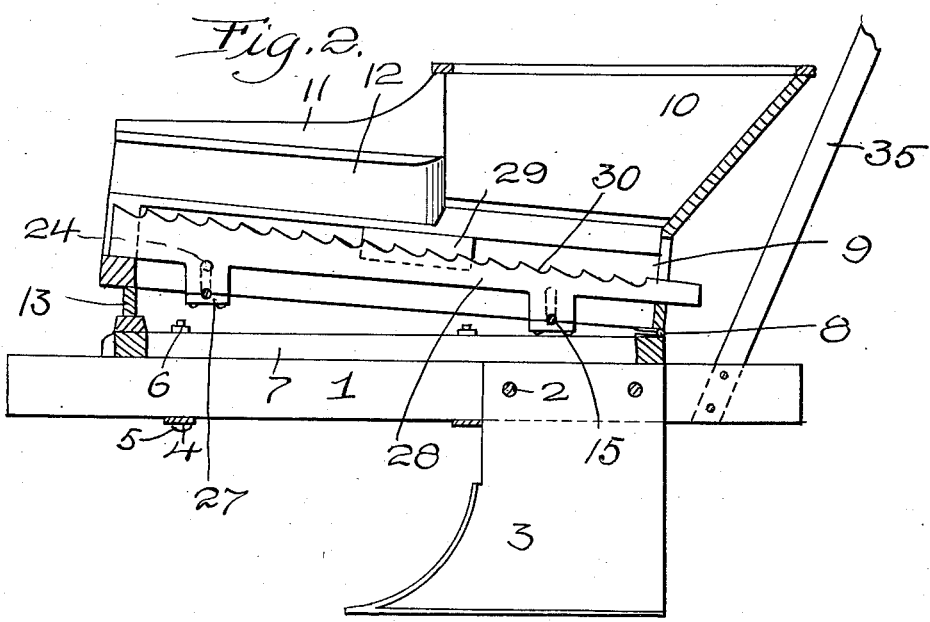
Figure 3:
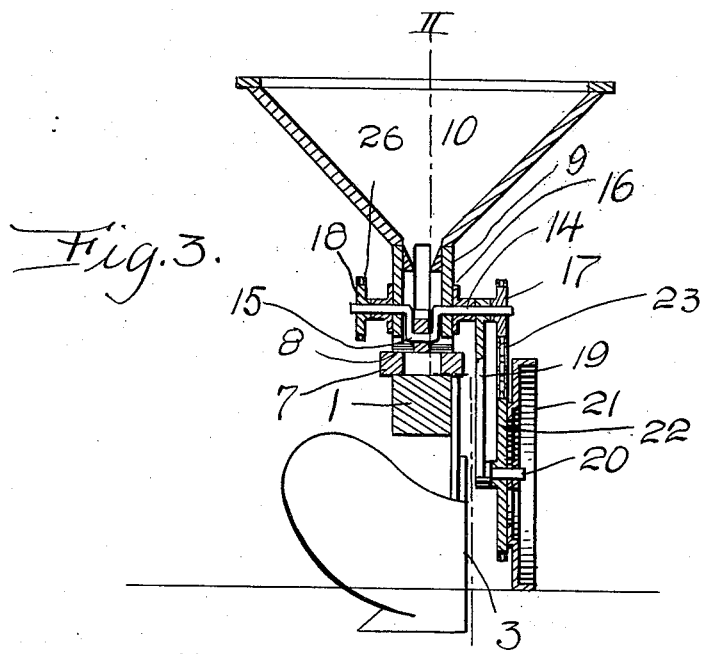

Figure 1 is a side elevation of the implement. Fig. 2 is a longitudinal sectional view of the same on line 2—2 Fig. 3, Fig. 3 is a cross sectional view of the implement on line 3—3 Fig. 1, Fig. 4 is an end view of the same, and Fig. 5 is a perspective view of a detached depositing spout.

Further describing my invention in detail with reference to the accompanying drawings, wherein like numerals denote corresponding parts throughout: 1 denotes a longitudinal beam and secured to one side of said beam, as at 2, is a depending plowshare 3 in the form of a blade adapted to close a furrow which has been previously made by a suitable agricultural implement.

Secured to the beam 1 by cross heads 4, bolts 5 and nuts 6 is a rectangular frame 7 and hinged or otherwise pivotally connected to the rear end of said frame, as at 8 are the side walls 9 of a trough that is in communication with a hopper 10. The hopper is carried by the rear ends of the side walls 9, and the forward end of said hopper is in communication with a chute 11 that has the confronting sides thereof provided with deflectors 12. The forward end of the trough is supported in an elevated position by a transverse support 13, consequently the trough is held at an inclination relatively to the frame 7 and the angularity of this inclination can be adjusted as occasion demands. Journaled in the side walls 9 of the trough, adjacent to the rear end thereof, is a transverse shaft 14 that has a cranked portion 15 within said trough. The shaft 14 is supported by bearings 16 carried by the outer sides of the walls 9, and the ends of said shaft are provided with sprocket wheels 17 and 18. The shaft 14, adjacent to the sprocket wheel 17 is provided with an angularly disposed hanger 19, that is loosely mounted upon said shaft. The lower end of the hanger has a stud shaft 20 and revolubly mounted upon said shaft is a trailer wheel 21 having the inner side thereof provided with a fixed sprocket wheel 22. Over this wheel and the wheel 17 there is trained an endless sprocket chain 23. The wheel 21 remains in engagement with the ground, by gravity, over which the planter passes and imparts a rotary movement to the crank shaft 14. A crank shaft 24 is journaled in the forward end of the trough, said shaft being similar to the shaft 14. One end of the shaft has a sprocket wheel 25 and trained over said wheel and the sprocket wheel 18 is an endless sprocket chain 26, whereby the shafts 14 and 24 can be operated in unison. The cranked portions of the shafts 14 and 24 are loosely mounted in bearings 27 to the lower edge of a reciprocatory feeding member 28 arranged longitudinally of the trough. The member is movable between guides 29, carried by the walls 9 and the upper edge of said member is scalloped or provided with pockets 30 to receive seed potatoes and carry the same forward in the chute 11 and the member 28.

Figure 4:
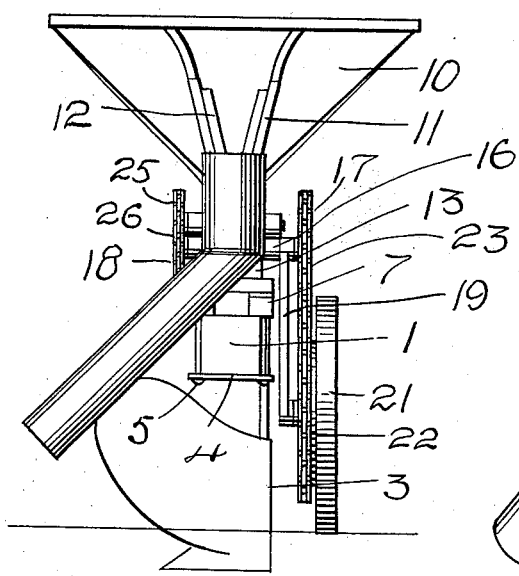
Figure 5:
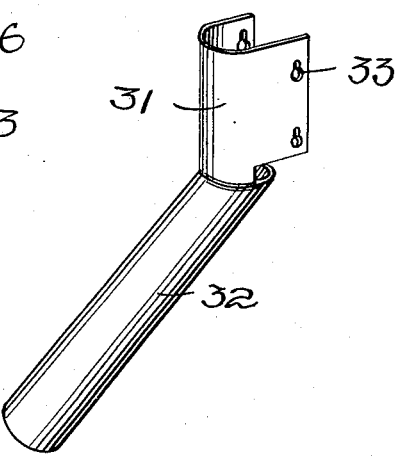

Detachably connected to the side walls 9, at the forward ends thereof, is the upper end 31 of an angularly disposed seed spout 32 that is clearly shown in Figs. 4 and 5. The upper end of the spout is slotted, as at 33 to receive headed pins 34 carried by the walls 9, said pins and said slots constituting means for detachably holding the spout relatively to the trough. The rear end of the beam 1 has ordinary plow handles 35 to assist in guiding the movement of the implement. As the seed potatoes are discharged from the spout 32 they are covered by the plowshare 3 and by resorting to the reciprocatory feeding member 28, only one seedling is deposited at a time, consequently the potatoes or the seed vegetables within the hopper can be properly spaced and sown in the ground.

It is thought that the operation and utility of the invention will be apparent without further description, and while in the drawings there is illustrated a preferred embodiment of the invention, it is to be understood that the structural elements are susceptible to such variations and modifications as fall within the scope of the appended claims.

What I claim is:—

1. A planter comprising a beam, a plowshare, an adjustable inclined trough supported by said beam, a hopper in communication with said trough, a reciprocatory feeding member arranged longitudinally of said trough, and means engaging the ground and including crank shafts for imparting a reciprocatory movement to said member.

2. A planter comprising a beam, a plowshare carried thereby, an adjustable trough arranged longitudinally of said beam, a hopper in communication with said trough, a spout at the forward end of said trough, a reciprocatory feeding member arranged longitudinally of said trough, crank shafts arranged transversely of said trough for imparting movement to said member, and means including a trailer wheel for imparting movement to said shafts.

3. A planter comprising a beam, a trough adjustable upon said beam, a hopper in communication with said trough, a reciprocatory member movable longitudinally of said trough, and means including a trailer wheel for imparting movement to said member.

4. A planter comprising a beam, a plowshare carried thereby, a trough adjustably supported by said beam, a hopper in communication with said trough, a detachable spout at the forward end of said trough, a movable feeding member arranged in said trough, and means including a trailer wheel and crank shafts for imparting movement to said member.

In testimony whereof I affix my signature in the presence of two witnesses.

JOE GYULAY.

Witnesses:
 LOUIS PIPPE,
 M. McGINLEY.

---

Copies of this patent may be obtained for five cents each, by addressing the "Commissioner of Patents. Washington, D. C."